United States Patent
Sundaresan et al.

(10) Patent No.: US 10,582,529 B2
(45) Date of Patent: Mar. 3, 2020

(54) SPECULATIVE SCHEDULING IN MOBILE NETWORKS

(71) Applicant: NEC Laboratories America, Inc., Princeton, NJ (US)

(72) Inventors: Karthikeyan Sundaresan, Manalapan, NJ (US); Eugene Chai, Monmouth junstion, NJ (US); Mohammad Khojastepour, Lawrenceville, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 112 days.

(21) Appl. No.: 15/915,491

(22) Filed: Mar. 8, 2018

(65) Prior Publication Data

US 2018/0270849 A1    Sep. 20, 2018

Related U.S. Application Data

(60) Provisional application No. 62/615,478, filed on Jan. 10, 2018, provisional application No. 62/471,549, filed on Mar. 15, 2017.

(51) Int. Cl.
*H04J 3/06* (2006.01)
*H04W 72/12* (2009.01)
(Continued)

(52) U.S. Cl.
CPC ....... *H04W 72/1268* (2013.01); *H04W 48/16* (2013.01); *H04W 56/001* (2013.01);
(Continued)

(58) Field of Classification Search
CPC .............. H04W 56/00; H04W 56/0045; H04B 7/2662; H04J 2011/0096
See application file for complete search history.

(56) References Cited

U.S. PATENT DOCUMENTS

2015/0003370 A1* 1/2015 Yokomakura ......... H04W 52/24
                                                       370/329
2016/0278062 A1* 9/2016 Hunukumbure .... H04W 72/085
(Continued)

OTHER PUBLICATIONS

Tahir Muhammad Mushtaq et al., "Spectrum Scheduling: The Key Factor for Maximum Throughput and Optimal Resource Utilization in Cognitive Radio Network", Sci.Int. (Lahore), 26(1), pp. 113-116, ISSN 1013-5316, Mar. 12, 2014 (See abstract: p. 113, right column, line 2; p. 114, right column, line 8).

(Continued)

*Primary Examiner* — Siren Wei
(74) *Attorney, Agent, or Firm* — Joseph Kolodka

(57) ABSTRACT

A system is provided for speculative scheduling that includes a base station having a processor. The processor computes an overall schedule for a set of clients. The overall schedule is formed from a set of speculative schedules, is configured to maximize unlicensed spectrum usage, and is computed by (a) determining a speculative schedule for each resource block from a set of resource blocks in a given sub-frame based on statistics determined for the clients individually and jointly, and (b) selecting, for formation into the overall schedule, (i) a particular resource block and (ii) the speculative schedule for the particular resource block, that yield the maximum incremental utility relative to already determined speculative schedules for other resource blocks in the set, based on criteria including uplink access statistics. The processor executes the overall schedule responsive to a completion of the speculative schedule determination for each resource block in the given sub-frame.

6 Claims, 9 Drawing Sheets

(51) Int. Cl.
    *H04W 56/00* (2009.01)
    *H04W 48/16* (2009.01)
    *H04W 88/08* (2009.01)
    *H04W 84/04* (2009.01)
(52) U.S. Cl.
    CPC ... *H04W 72/1226* (2013.01); *H04W 72/1257* (2013.01); *H04W 84/042* (2013.01); *H04W 88/08* (2013.01)

(56) References Cited

U.S. PATENT DOCUMENTS

2017/0041805 A1* 2/2017 Chandrasekhar ............................ H04W 74/0816
2018/0249499 A1* 8/2018 Kim ...................... H04W 72/04

OTHER PUBLICATIONS

Chaves et al., "LTE UL Power Control for the Improvement of LTE/Wi-Fi Coexistence", In Vehicular Technology Conference (VTC Fall), Sep. 2013, pp. 1-6.
Chai et al., "LTE in Unlicensed Spectrum: Are We There Yet?", MobiCom'16, Oct. 2016, pp. 1-14.

* cited by examiner

SPECULATIVE SCHEDULING IN MOBILE NETWORKS

RELATED APPLICATION INFORMATION

This application claims priority to provisional application Ser. No. 62/615,478 filed on Jan. 10, 2018, incorporated herein by reference.

BACKGROUND

Technical Field

The present invention relates to mobile communications, and more particularly to speculative scheduling in mobile networks.

Description of the Related Art

Wireless interference is a significant source of performance degradation in wireless networks. The problem is especially acute in unlicensed spectrum bands (e.g., Industrial, Scientific, and Medical (ISM) and Citizens Broadband Radio Service (CBRS) bands), where multiple devices belonging to different service providers all operate in the same spectrum simultaneously, thereby leading pronounced interference.

While this problem exists in WIFI, which operates in the ISM band, WIFI as a technology has incorporated asynchronous channel sensing mechanisms as part of its access protocol to sense and avoid such unknown interference. However, with the scarcity of spectrum as wireless networks migrate to 5G, cellular networks are starting to aggregate unlicensed spectrum bands along with their licensed bands to deliver increased capacity. However, the synchronous access mechanisms developed by cellular access protocols in licensed spectrum are no longer effective when operating in an unlicensed spectrum. This is because the unlicensed spectrum is governed by asynchronous, unknown interference from multiple service providers and their devices. Consequently, cellular networks operating in unlicensed spectrum suffer significant performance degradation. While recent efforts in the form of Long-Term Evolution-License Assisted Access (LTE-LAA) and Long-Term Evolution-Enhanced License Assisted Access (LTE-eLAA) help alleviate some of the degradation they do solve the problem. In particular, with the cellular base station scheduling both downlink (base station to client) and uplink (client to base station) transmissions, the problem is exacerbated on the uplink, where the schedule grants given by the BS to clients on the uplink are oblivious to the interference faced by the clients. This leads to clients not being able to utilize their allocated grants resulting in severe underutilization of spectral resources on the uplink, and consequently degraded LTE performance in unlicensed spectrum. Hence, there is a need for improved scheduling in mobile networks.

SUMMARY

According to an aspect of the present invention, a system is provided for speculative scheduling for mobile access in an unlicensed spectrum of a synchronous scheduled cellular access system. The system includes a cellular base station having a processor. The processor is configured to compute an overall intelligent uplink schedule for a set of clients. The overall intelligent schedule is formed from a set of speculative schedules, is configured to maximize unlicensed spectrum usage, and is computed by determining, by the processor, a speculative schedule for each resource block from among a set of resource blocks in a given sub-frame based on uplink access statistics determined for the clients individually and jointly. The overall intelligent schedule is further computed by selecting, by the processor for formation into the overall intelligent schedule, (i) a particular resource block from the set and (ii) the speculative schedule for the particular resource block, that yield the maximum incremental utility relative to already determined speculative schedules for other ones of the resource blocks in the set, based on criteria that includes the uplink access statistics. The processor executes the overall intelligent schedule responsive to a completion of the speculative schedule determination for each of the resource blocks in the given sub-frame.

According to another aspect of the present invention, a computer-implemented method is provided for speculative scheduling for mobile access in an unlicensed spectrum of a synchronous scheduled cellular access system. The method includes computing, by a cellular base station having a processor, an overall intelligent uplink schedule for a set of clients. The overall intelligent schedule is formed from a set of speculative schedules, is configured to maximize unlicensed spectrum usage, and is computed by determining, by the processor, a speculative schedule for each resource block from among a set of resource blocks in a given sub-frame based on uplink access statistics determined for the clients individually and jointly. The overall intelligent schedule is further computed by selecting, by the processor for formation into the overall intelligent schedule, (i) a particular resource block from the set and (ii) the speculative schedule for the particular resource block, that yield the maximum incremental utility to already determined speculative schedules for other ones of the resource blocks in the set, based on criteria that includes the uplink access statistics. The method further includes executing, by the processor, the overall intelligent schedule responsive to a completion of each of the resource blocks in the sub-frame being scheduled.

According to yet another aspect of the present invention, a computer program product is provided for speculative scheduling for mobile access in an unlicensed spectrum of a synchronous scheduled cellular access system. The computer program product includes a non-transitory computer readable storage medium having program instructions embodied therewith. The program instructions are executable by a computer for controlling a cellular base station to cause the computer to perform a method. The method includes computing, by a cellular base station having a processor, an overall intelligent uplink schedule for a set of clients. The overall intelligent schedule is formed from a set of speculative schedules, is configured to maximize unlicensed spectrum usage, and is computed by determining, by the processor, a speculative schedule for each resource block from among a set of resource blocks in a given sub-frame based on uplink access statistics determined for the clients individually and jointly. The overall intelligent schedule is further computed by selecting, by the processor for formation into the overall intelligent schedule, (i) a particular resource block from the set and (ii) the speculative schedule for the particular resource block, that yield the maximum incremental utility to already determined speculative schedules for other ones of the resource blocks in the set, based on criteria that includes the uplink access statistics. The method further includes executing, by the processor, the overall intelligent schedule responsive to a completion of each of the resource blocks in the sub-frame being scheduled.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to speculative scheduling in mobile networks.

In an embodiment, the present invention addresses the aforementioned problem of wireless interference in unlicensed spectrum bands by helping a cellular base station make intelligent allocations of uplink schedule grants to appropriate clients that will result in efficient utilization of spectral resources even in the face of unknown interference. In an embodiment, the present invention accomplishes this by leveraging the channel access statistics of its clients, both in isolation as well as jointly, to determine the right set of clients that need to be jointly scheduled to not just leverage channel diversity, but more importantly interference diversity. The present invention overschedules (more clients than can be potentially decoded at a receiver) the right set of clients with interference diversity on the same spectral resources to compensate for the potential under-utilization that may result during actual uplink transmission.

Figure 1:
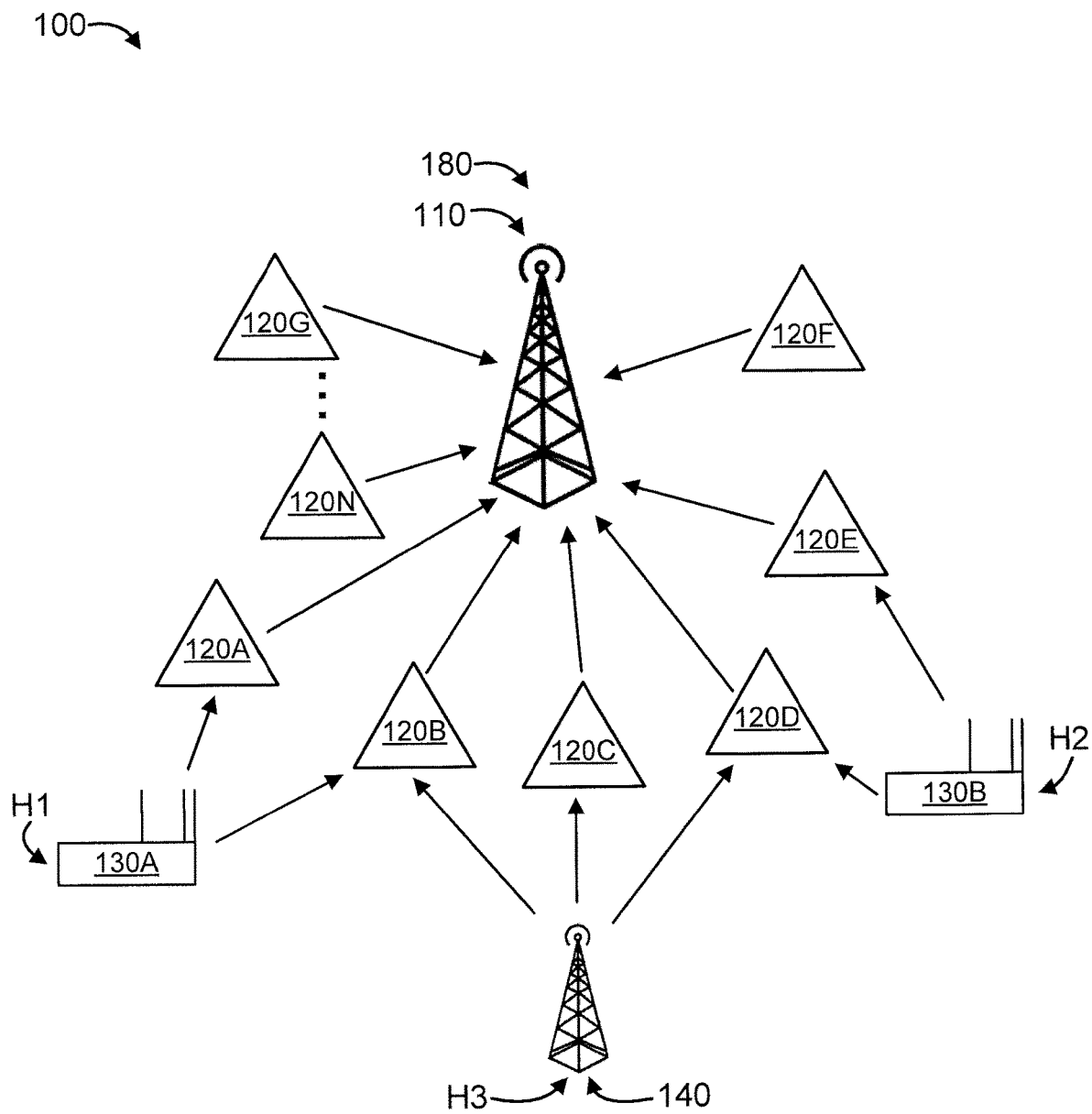
FIG. 1 is a block diagram showing an exemplary environment to which the present invention can be applied, in accordance with an embodiment of the present invention.

FIG. 1 is a block diagram showing an exemplary environment 100 to which the present invention can be applied, in accordance with an embodiment of the present invention.

The environment 100 relates to an LTE uplink in unlicensed spectrum that is affected by hidden terminals (H1-H3) as described in further detail herein below.

The environment 100 includes an LTE base station 110 and a set of clients 120A-N that are served by the LTE base station 110. The set of clients 120A-N can represent a set of User Equipment (UE). The UE can be any of, but not limited to, cellular phones as well as tablets, laptops, and any other computing devices capable of cellular communication. The environment 100 further includes hidden terminals H1-H3, respectively corresponding to a WIFI node 130A, a WIFI node 130B, and another base station 140. The LTE base station 110 can include or be coupled to a processing system 180 for controlling the LTE base station 110.

One of the key differences between LTE and WIFI is the synchronous and scheduled nature of LTE transmissions compared to the asynchronous WIFI transmissions. Synchronous transmissions in LTE contribute to increased capacity through multi-user diversity (Orthogonal Frequency-Division Multiple Access (OFDMA)) and spatial multiplexing (multi-user Multiple-Input and Multiple-Output (MIMO)) gains, especially on the uplink, where it is otherwise challenging to synchronize clients (e.g., clients 120A-N). However, these very same features make it particularly challenging for realizing gains in unlicensed spectrum, where the impact of asynchronous interference (through hidden terminals from WIFI (e.g., WIFI nodes 130A and 130B) or other LTE nodes (e.g., base station 140)) on concurrent transmissions is significantly amplified. This reveals a fundamental conflict between the synchronous multi-user transmissions in LTE and asynchronous access in unlicensed spectrum.

Figure 2:
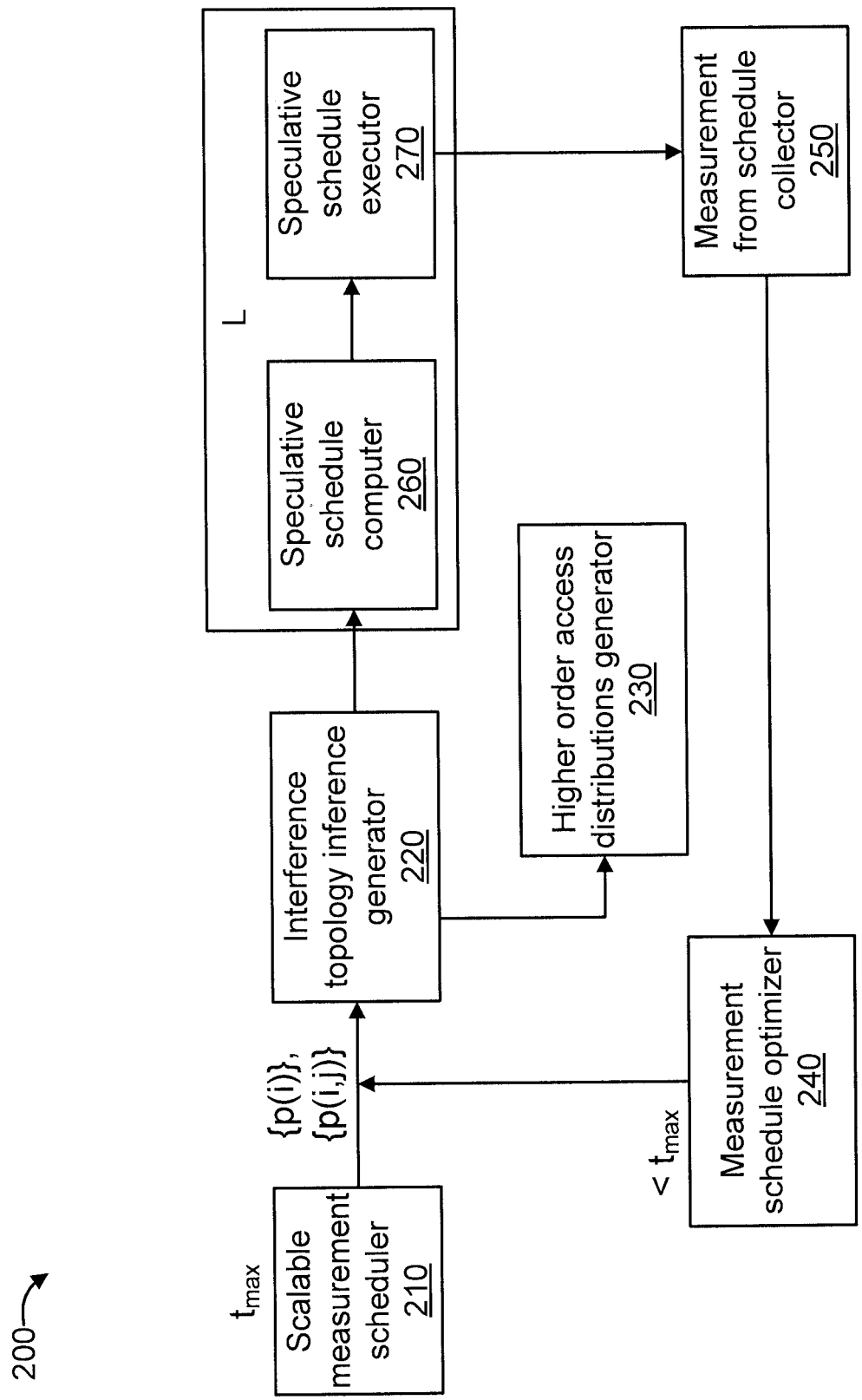
FIG. 2 is a high-level block diagram showing an exemplary system for speculative scheduling for mobile access in an unlicensed spectrum of a synchronous scheduled cellular access system, in accordance with an embodiment of the present invention.

FIG. 2 is a high-level block diagram showing an exemplary system 200 for speculative scheduling for mobile access in an unlicensed spectrum of a synchronous scheduled cellular access system, in accordance with an embodiment of the present invention.

The system 200 includes a scalable measurement scheduler 210, an interference topology inference generator 220, a higher order access distributions generator 230, a measurement schedule optimizer 240, a measurement from schedule collector 250, a speculative schedule computer 260, and a speculative schedule executor 270.

The present invention orchestrates its various design components to execute its speculative scheduler at eNBs (LTE base stations) as shown in FIG. 2. The present invention operates the uplink eNB schedule in two phases repeatedly: a measurement schedule phase (involving the eNB and clients) for $t_{max}$ sub-frames; and a speculative schedule phase (involving the eNB and clients) for L sub-frames ($L \gg t_{max}$). In the measurement phase, clients are scheduled with the objective of obtaining the desired client access distributions (p(i), p(i, j)) with minimal overhead. In the speculative scheduling phase, the present invention blueprints the source interference topology from the measured distributions and uses it to determine the higher-order joint client access distributions that are needed for speculatively scheduling, especially MU-MIMO transmissions for higher utilization and efficiency.

L is chosen to track dynamics in the topology (both clients and interference), which happens at the granularity of tens of seconds to minutes. Hence, L is in the order of tens of thousands of sub-frames, while $t_{max}$ is in the order of few hundred sub-frames. For example, for a 20 (N) client cell with a 50 (T) measurement sample requirement per client-pair, and maximum of 8 (K) distinct clients per sub-frame schedule, $t_{max} \approx 340$ sub-frames. Further, note that, other than the first time that the eNB is operated, the measurement phase is run for less than $t_{max}$ sub-frames, as the outcome of the schedule during the speculative phase will implicitly contribute to measurements as well. Hence, the measurement phase can be significantly reduced by removing client pairs for which, sufficient data is already available and for those, whose clients are inferred to have independent access distributions (e.g., located far away from each other). Thus, the measurement phase constitutes a very small part of the whole uplink (UL) schedule that is predominantly used to maximize UL utilization through speculative scheduling.

It is to be appreciated that various aspects of the present invention are further described in detail hereinafter. As such, the number of equations may not be initially sequential until the actual beginning of the further description is reached. Accordingly, it is to be further appreciated that equations having the same number are the same equation. The various equations presented initially are so presented for the sake of illustration and further clarified in the description thereafter.

Figure 3:
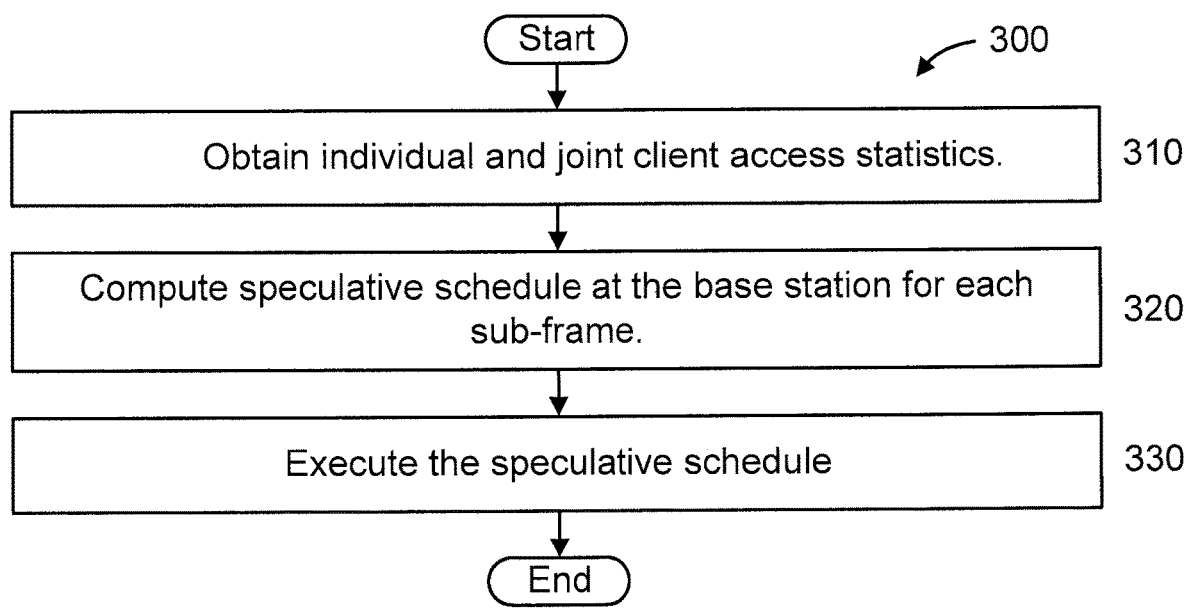
FIG. 3 is a flow diagram showing an exemplary method for speculative scheduling for mobile access in an unlicensed spectrum of a synchronous scheduled cellular access system, in accordance with an embodiment of the present invention.

FIG. 3 is a flow diagram showing an exemplary method 300 for speculative scheduling for mobile access in an unlicensed spectrum of a synchronous scheduled cellular access system, in accordance with an embodiment of the present invention.

At block 310, obtain individual and joint client access statistics.

At block 320, compute speculative schedule at the base station for each sub-frame.

At block 330, execute the speculative schedule.

Figure 4:
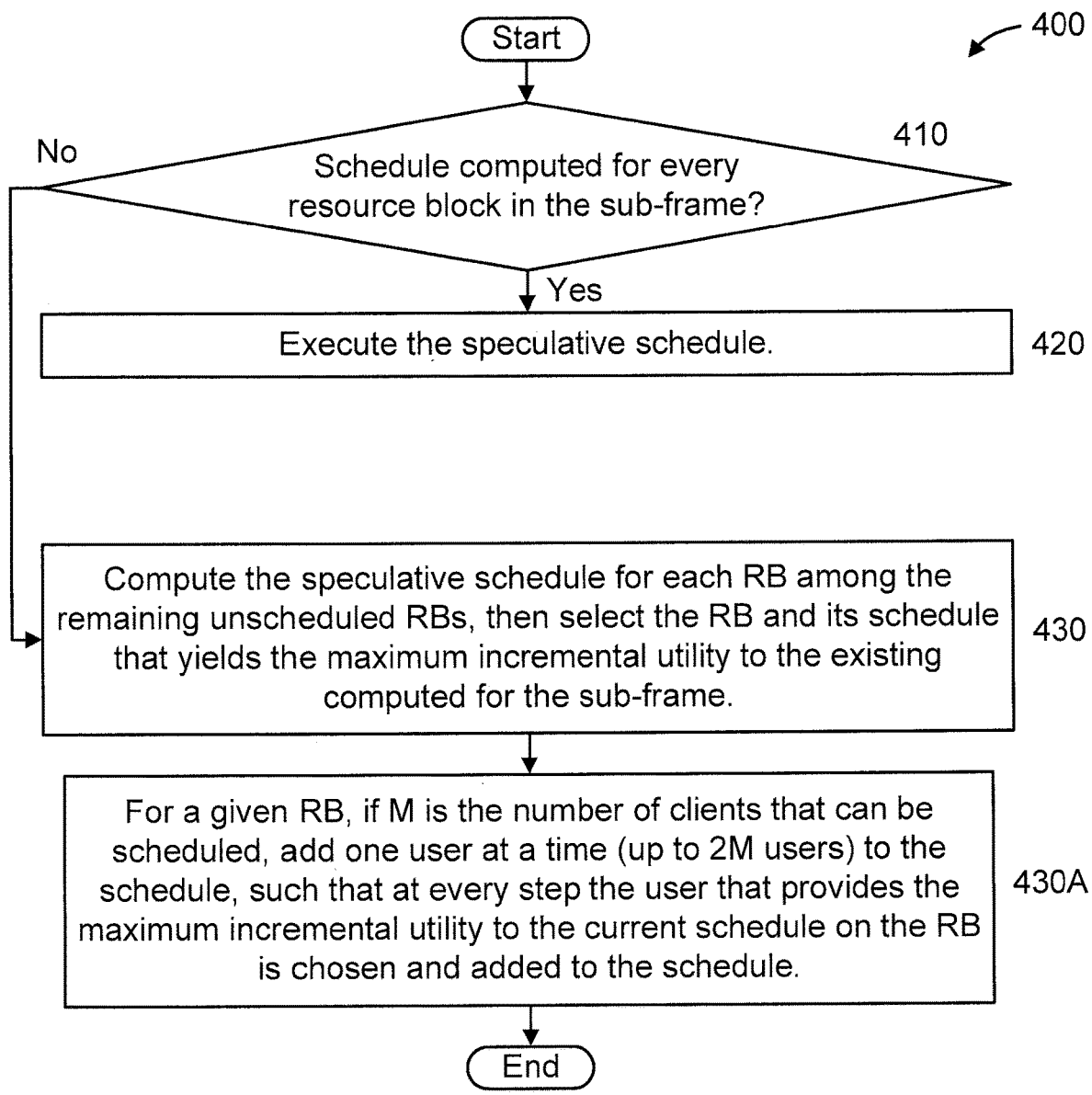
FIG. 4 is a flow diagram furthering showing a block of the method of FIG. 3, in accordance with an embodiment of the present invention.

FIG. 4 is a flow diagram further showing block 320 of method 300 of FIG. 3, in accordance with an embodiment of the present invention.

At block 410, it is determined whether there is a schedule computed for every resource block (RB) in the sub-frame. If so, then the method proceeds to block 420. Otherwise, the method proceeds to block 430.

At block 420, execute the speculative schedule.

At block 430, compute the speculative schedule for each RB among the remaining unscheduled RBs, then select the RB and its schedule that yields the maximum incremental utility to the existing computed for the sub-frame.

In an embodiment, block 430 can include block 430A.

At block 430A, for a given RB, if M is the number of clients that can be scheduled, add one user at a time (up to 2M users) to the schedule, such that at every step the user that provides the maximum incremental utility to the current schedule on the RB is chosen and added to the schedule.

In an embodiment, step 430A can be implemented as follows. For an existing set of clients (Gb) scheduled on RB b, we select and add another client l* that provides the maximum incremental utility to the current schedule on that RB as follows:

$$l^* = \underset{l \notin G_b}{\mathrm{argmax}}\{E(G'_b) - E(G_b)\}; \text{ where } G'_b \leftarrow G_b \cup l \quad (2)$$

The expected utility of a schedule on a RB depends on the total number of its scheduled clients, who can use the grant, being less than or equal to the total number of antennas (M) at the eNB, their joint access distribution, and the utility of those specific clients in the group as follows:

$$E(G'_b) = \Sigma_{g:g \subseteq G'_b, \&|g| \leq M}(\mathbb{P} \overline{(g, G'_b \setminus g)} \sum_{i \in g} \frac{r_{i,b,g}}{R_i}) \quad (3)$$

where $\mathbb{P}(g,\overline{G'_b \setminus g})$ represents the joint access distribution of the group, that is, the probability that all the clients in g (e.g., clients 1,2 in $\mathbb{P}(1, 2, \overline{3}, \overline{4})$ are able to utilize the grants, while all the remaining clients $j \in G'_b \setminus g$; clients 3 and 4 in our example) are not able to utilize the grants. The size of g represents the number of eventual transmissions on the RB. If M is the number of antennas at the BS (in the above example M=2), then when size of g is more than M, it will lead to collisions and hence contribute to zero utility. Hence, the size of g should be less than or equal to M. However, the size of the speculative schedule $G'_b$ itself is typically more than M (i.e., overschedule) to compensate for the under-utilization of allocations during actual uplink transmissions from clients. Note that M=1 (single antenna) means single user (Single-Input and Single-Output (SISO)) transmissions, while M>=2 means multi-user (MIMO) transmissions.

While the speculative scheduler approach is generic and can be applied to different fairness policies in scheduling, the above equation for expected utility is specific to proportional fairness that is widely employed in cellular networks today.

Figure 5:
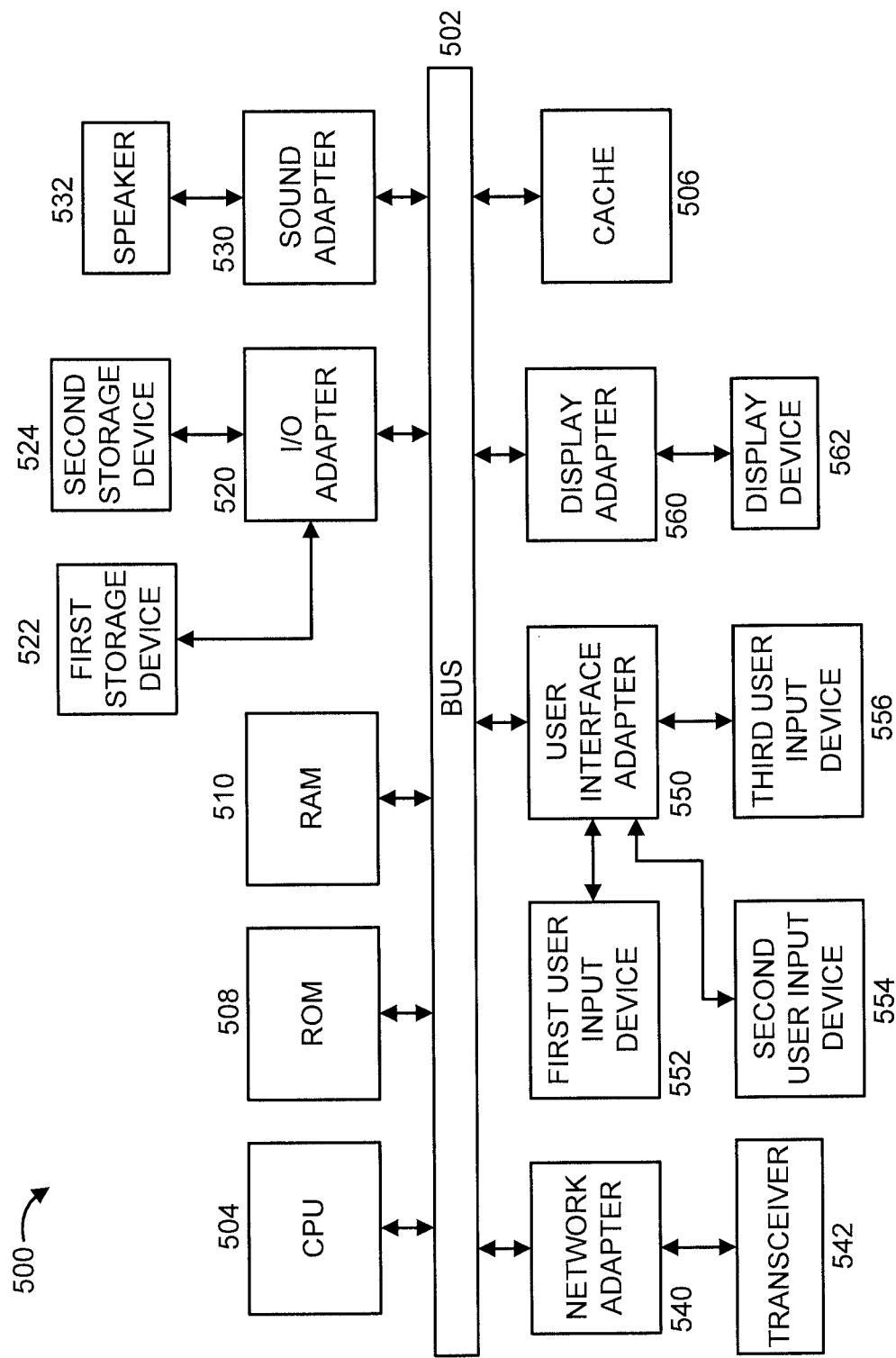
FIG. 5 is a block diagram shows an exemplary processing system 500 to which the present principles may be applied, according to an embodiment of the present principles.

FIG. 5 is a block diagram showing an exemplary processing system 500 to which the present principles may be applied, according to an embodiment of the present principles.

The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that system 100 described above with respect to FIG. 1 is a system for implementing respective embodiments of the present principles. Part or all of processing system 500 may be implemented in one or more of the elements of system 100. For example, processing system 500 can be included the base station of FIG. 1, in accordance with an embodiment of the present invention.

Further, it is to be appreciated that processing system 500 may perform at least part of the methods described herein including, for example, at least part of method 300 of FIG. 3 and/or at least part of method 400 of FIG. 4.

A description will now be given regarding various aspects of the present invention.

LTE Overview: LTE is a synchronous, scheduled access system designed for operation in the licensed spectrum. The eNB is responsible for scheduling both the downlink (DL) and uplink (UL) clients in its sub-frames (1 ms long), which consists of two-dimensional resource elements spanning both time (symbols) and frequency (sub-carriers), called resource blocks (RBs). LTE employs OFDMA (orthogonal frequency division multiple access), whereby multiple clients are scheduled in each sub frame across RBs and, in the case of multi-user MIMO, multiple clients are scheduled on each RB. The schedule for both downlink (DL) and uplink (UL) transmissions is conveyed to the clients through the control part of the DL sub-frames.

LTE in Unlicensed Spectrum: Unlike traditional LTE that operates in an always-on mode in licensed spectrum, operating in the unlicensed spectrum requires LTE to adopt asynchronous access principles of energy sensing (clear-channel assessment, CCA) and back-off for coexistence with the incumbents.

A conflict arises as follows in the form of a pronounced interference impact on UL Access: Asynchronous access in WIFI is largely a transmitter-driven procedure (in the absence of Request to Send/Clear to Send (RTS/CTS)), where the sender (access point (AP) in DL and client in UL) senses (cyclic cellular automaton (CCA)) the channel for idle state before starting its transmission. LTE adopts a similar approach in its DL, with one difference being that once the eNB gains access, it will transmit to multiple users simultaneously using OFDMA (compared to single-user OFDM in WIFI). This leads to a more frequent impact from interference (compared to WIFI) such as an increased probability of some client in each sub-frame being prone to interference (collision) from hidden terminals. However, the magnitude of the impact is restricted to a smaller chunk of the spectrum compared to the entire bandwidth in WIFI. Hence, the over all impact of interference on DL access is largely similar in both WIFI and LTE.

However, the problem is significantly different on the UL. Again, the eNB senses the channel (compared to clients themselves in WIFI) and schedules the synchronous access of multiple clients on the UL in LTE. This makes it possible to realize the gains from OFDMA and MU-MIMO, which are otherwise not possible on the UL (e.g., WIFI). However, since the instantaneous channel (interference) state of the clients cannot be known a priori in unlicensed spectrum, a scheduled LTE client that is inhibited by an interfering transmission (hidden to the eNB) will not be able to utilize its allocated UL grant. This leads to an underutilization of spectral resources, which is a problem that is not encountered in WIFI and exacerbated by multi-user access in LTE.

Impact Scales with Concurrency of Transmissions: To understand the magnitude of this problem, we collect access traces from an LTE single-cell test-bed, where the UL access of clients in the cell are impacted by WIFI hidden terminals as shown in FIG. 1. The loss in utilization scales with the number of hidden terminals as well as clients scheduled in each sub-frame, as both factors increase the probability of scheduled grants going unused in a sub-frame. With both OFDMA and MU-MIMO relying on an increased number of scheduled clients, the loss in utilization can be significantly high. This reveals a fundamental conflict between leveraging the increased gains (diversity from OFDMA and multiplexing from MU-MIMO) from LTE's synchronous, concurrent transmissions on the UL, and coexistence (asynchronous interference) in unlicensed spectrum.

A description will now be given regarding speculative scheduling in BETL, in accordance with an embodiment of the present invention.

LTE schedulers employ orthogonal frequency division multiple access (OFDMA) to leverage multi-user diversity. The spectrum (e.g., 20 MHz channel) is partitioned into resource blocks (groups of OFDM sub-carriers) and a user (users in case of MU-MIMO) with a higher rate on a RB is assigned to it, while accounting for fairness across clients. Proportional fair (PF) scheduling is the most popular scheduling model adopted in eNBs today as it strikes a good balance between throughput efficiency and fairness, allowing for clients with better channels to achieve a proportionally higher throughput.

The optimal scheduling policy can be obtained through a utility optimization framework that maximizes the aggregate utility of all the clients ($\Sigma_i U_i$). For PF scheduling, the utility function is the logarithm of the client's average throughput $U_i = \log(R_i)$. Being a convex optimization problem, picking a schedule that maximizes the gradient of the utility $$\left(\text{i.e., marginal utility,} \frac{dU_i}{dt} = \frac{r_i(t)}{R_i(t-1)}\right)$$

at each sub-frame t, achieves proportional fairness over a longer time period. The scheduling problem for each sub-frame with B sub frames and N clients now reduces to the following:

$$S^*(t)_{SISO} = \underset{x \in S}{\mathrm{argmax}} \left\{ \sum_{b=1}^{B} \sum_{i=1}^{N} \frac{x_{i,b} r_{i,b}(t)}{R_i(t-1)} \right\}, \text{s.t.} \sum_{i=1}^{N} x_{i,b} \leq 1, \forall b$$

$$MU-MIMO = \underset{y \in S}{\mathrm{argmax}} \left\{ \sum_{b=1}^{B} \sum_{i=1}^{N} \frac{y_{i,b} r_{i,b,g}(t)}{R_i(t-1)} \right\}, \text{s.t.} \sum_{i=1}^{N} y_{i,b} \leq M, \forall b$$

where $r_{i,b}(t)$ and $r_{i,b,g}(t)$ are the instantaneous rates of client i on RB b in SISO and MU-MIMO (depends on the group of clients g selected as well as their channels) respectively, while x and y are binary variables capturing the schedule. The above scheduling problem can be decoupled into multiple (individual) RB-level scheduling problems, $S^*_b(t)$. After each schedule, the average throughput of a client i gets updated as follows:

$$R_i(t)_{SISO} = \frac{1}{\alpha}\sum_{b=1}^{B} x^*_{i,b} r_{i,b}(t) + \left(1 - \frac{1}{\alpha}\right) R_i(t-1)$$

$$MU-MIMO = \frac{1}{\alpha}\sum_{b=1}^{B} x^*_{i,b} r_{i,b,g}(t) + \left(1 - \frac{1}{\alpha}\right) R_i(t-1)$$

where $\alpha$ is an exponential weighting constant. We will now focus on a sub-frame and hence drop the subscript of t for an easier exposition.

A description will now be given regarding the scheduler leveraging interference diversity, in accordance with an embodiment of the present invention.

Since the clients are scheduled by the eNB on the UL, interferers (WIFI or other LTE nodes) to the clients that are hidden from the eNB will prevent the clients from utilizing the allocated resource grants. If p(i) is the probability that client i is able to utilize its allocated grant, then the expected value of the schedule S* (for SISO) reduces to the following:

$$E(S^*) = \sum_{b=1}^{B} \sum_{i \in S^*_b} \frac{p(i) \cdot r_{i,b}}{R_i} \quad (1)$$

Depending on the impact of hidden terminals (reduced p(i)), existing schedulers, albeit efficient for licensed spectrum, can lead to significant underutilization in unlicensed spectrum.

BETL transforms the very challenge posed by scheduled, multi-user LTE transmissions into an opportunity as follows. Different clients in the same cell could be interfered by different hidden terminals (e.g., clients 1 and 3 in FIG. 1) and hence may not be silenced at the same time. BETL leverages this interference diversity across clients, coupled with LTE's ability to simultaneously schedule multiple users in an UL sub-frame, to overschedule multiple users (>M) on the same UL resource block to increase utilization. However, executing this intelligently by identifying which clients need to be overscheduled on the same RB is paramount, as multiple client transmissions (>1 for SISO and >M for MU-MIMO) on the same RB will lead to collisions and, hence, a much worse performance than the underutilized schedule.

BETL makes its decisions based on the expected utility of a schedule that accounts for the joint (dependent) stochastic access patterns of the clients. For a given RB b and an existing set of clients ($G_b$) scheduled on it, BETL selects and adds another client l* that provides the maximum incremental utility to the current schedule on that RB as follows:

$$l^* = \underset{\ell \notin G_b}{\arg\max} \{E(G'_b) - E(G_b)\}; \text{ where } G'_b \leftarrow G_b \cup \ell \quad (2)$$

In its most generic form, the expected utility of a schedule on a RB depends on the total number of its scheduled clients, who can use the grant, being less than or equal to the total number of antennas (M) at the eNB, their joint access distribution, and the utility of those specific clients in the group as follows:

$$E(G'_b) = \Sigma_{g:g \subseteq G'_b \& |g| <= M}\left(\mathbb{P}\left(g, \overline{G'_b \setminus g}\right) \sum_{i \in g} \frac{r_{i,b,g}}{R_i}\right) \quad (3)$$

where, $\mathbb{P}(g,\overline{G'_b/g})^3$ represents the joint access distribution of the group, that is, the probability that all the clients in g (e.g., clients 1,2 in $\mathbb{P}(1, 2, \overline{3}, \overline{4})$) are able to utilize the grants, while all the remaining clients (j∈G'_b/g; clients 3 and 4 in our example) are not able to (i.e., $\overline{j}$). The size of g represents the eventual transmissions on the RB and hence can be up to M (number of antennas); otherwise, this would lead to collisions on all the transmissions on the RB. The addition of clients to the RB's schedule stops, when no remaining client can further increase the schedule's utility. As the number of clients carefully scheduled in an RB continues to increase beyond M, it increases the potential for utilization but it also increases the risk of collisions from overscheduling, thereby resulting in diminishing returns. BETL's speculative scheduler strikes a fine balance and typically overschedules between [1, 2M] clients (i.e., f=2) on an RB as determined by Equations (2) and (3).

Importance of Joint Access Distribution: Joint access distribution of clients is critical for overscheduling. In its absence, one can devise a weighted proportional fair schedule that accounts for the individual access probabilities of clients, but will not have the interference dependency information needed to intelligently overschedule (overscheduling clients sharing common hidden terminals can lead to collisions or under-utilization). We refer to this as the access-aware scheduler, implemented as follows:

$$E(G'_b) = \Sigma_{i \in G'_b \& |G'_b| <= M} \frac{\mathbb{P}(i) \cdot r_{i,b,G'_b}}{R_i} \quad (4)$$

Example: As an example, consider a SISO speculative schedule on an RB. The first client is chosen as $$s_1 = \arg\max_i \left\{\mathbb{P}(i) \cdot \frac{r_{i,b}}{R_i}\right\}.$$

The next client to be (over) scheduled on the same RB is chosen as follows:

$$s_2 = \arg\max_{i \neq s_1}\left\{\mathbb{P}(i, \overline{s_1}) \cdot \frac{r_{i,b}}{R_i} + \mathbb{P}(\overline{i}, s_1) \cdot \frac{r_{s_1,b}}{R_{s_1}}\right\}$$

where $\mathbb{P}(i, \overline{s_1})$ indicates the probability that i is able to transmit, while $s_1$ is not, and vice versa. Note that for SISO, $\mathbb{P}(i, s_1)$ and $\mathbb{P}(\overline{i,s_1})$ don't contribute to useful transmissions, leading to collision and no-transmission respectively. $s_2$ is then overscheduled, only if the access distributions (interference diversity) of the two clients $s_1$ and $s_2$ are such that they allow for a better utilization than the current schedule, as follows:

$$\left\{\mathbb{P}(s_2, \overline{s_1}) \cdot \frac{r_{s_2,b}}{R_{s_2}} + \mathbb{P}(\overline{s_2}, s_1) \cdot \frac{r_{s_1,b}}{R_{s_1}}\right\} > \left\{\mathbb{P}(i) \cdot \frac{r_{s_1,b}}{R_{s_1}}\right\}$$

Subsequent clients to be overscheduled on the same RB are iteratively evaluated in a similar procedure using Equations (2) and (3).

A description will now be given regarding scalable measurement overhead in BETL, in accordance with an embodiment of the present invention.

The challenge in executing the proposed scheduler in BETL is the need to estimate the joint access distribution of clients $\mathbb{P}$ (g, $\overline{G'_b/g}$)). For example, one would need to estimate $\mathbb{P}$ (1, 2, $\overline{3}$, $\overline{4}$), $\mathbb{P}$ (1, 3, $\overline{2}$, $\overline{5}$), and so forth for a M=2 user MU-MIMO speculative schedule. LTE's ability to leverage OFDMA on the UL allows BETL to estimate the joint access (probability) distributions of clients directly from their transmissions, that is, schedule multiple clients jointly in each UL sub-frame and measure their ability to use (transmit on) those scheduled grants over time. Although data is transferred during these measurement sub-frames, the client schedule is optimized for obtaining the desired access information rather than for performance. Hence, it is imperative to keep the overhead of this measurement phase as small as possible.

The number of distinct clients (K) that can be scheduled together in each sub-frame is typically much smaller (less than 10) than the number of clients in a cell (N). This raises two issues as follows: (i) for larger MU-MIMO systems, it is not feasible to get any k-client (k∈[1, 2M]) joint distribution when k>K, e.g., estimating $\mathbb{p}$ (1, 2, 3, $\overline{4}$, $\overline{5}$) (i.e., k=5) is not possible when at most K=4 distinct clients can be scheduled in a sub-frame; and (ii) even when k≤K, if T samples (sub-frames) are needed to measure the joint distribution of each k-client tuple, then the associated overhead (minimum number of sub-frames) for estimating all such k-tuples is $$\left\lceil \frac{\binom{N}{k}}{\binom{K}{k}} T \right\rceil \text{ sub-frames,}$$

which scales exponentially with k (and hence M) as $$O \frac{N^{\min\{k, N-k\}}}{K^{\min\{k, K-k\}}}.$$

For example, measuring all 6-client joint distributions (for M=3 MU MIMO) in a cell of 20 clients with $$K = 8 \text{ requires a minimum of } \left\lceil \frac{\binom{20}{6}}{\binom{8}{6}} T \right\rceil \approx 1384T \text{ sub-frames.}$$

In contrast, BETL proposed to work with just pair-wise client distributions, which in a constant significantly reduced overhead of $$F_{min} = \left\lceil \frac{\binom{N}{2}}{\binom{K}{2}} T \right\rceil \text{ sub-frames}$$

(only <7T sub-frames for the above example) that is $$O\left(\frac{N}{K}\right)^2)$$

and completely independent of M. We determine the schedule of clients for successive measurement sub-frames that will estimate all the pair-wise access distributions need in $F_{min}$ sub-frames (lower bound). This being a hard problem in itself, BETL employs the following scheduling algorithm 1 (in the measurement period) to estimate these distributions with as small a number of sub-frames as possible (close to $F_{min}$).

In each sub-frame during the measurement period, BETL schedules K clients that will contribute the most value towards measuring pair-wise distributions; i.e., K clients are chosen, whose resulting pair-wise distributions have the least number of measurements thus far. A logarithmic function of the measurement count is employed to ensure that each pair is sampled for approximately the same number of times at any point during the measurement period. This provides for flexibility in using the measurements even before the end of the period, if desired.

A description will now be given regarding blue-printing interference, in accordance with an embodiment of the present invention.

Instead of spending the measurement overhead to estimate all the joint access distributions, BETL aims to leverage just the pair-wise access distribution measurements to "blue-print" the source of the interference itself, which in turn is responsible for all the joint client access distributions.

The challenge lies in how to blue-print the hidden terminal interference on the clients. In other words, given the individual ($\mathbb{p}$ (i)=p(i)) and pairwise ($\mathbb{p}$ (i,j)=p(i,j)) client access distributions, can we determine the topology characterized by (i) the number of hidden terminals (h), (ii) their access distributions (q(k), k∈[1, h]), as well as (iii) their impact on specific clients (edges, $z_{ik}$, i∈$\mathcal{N}$, k∈[1, h]), that will contribute to these observed distributions. An edge from a hidden terminal to a client indicates that the latter can sense the former's transmission, when it exists and will defer its own.

Figure 6:
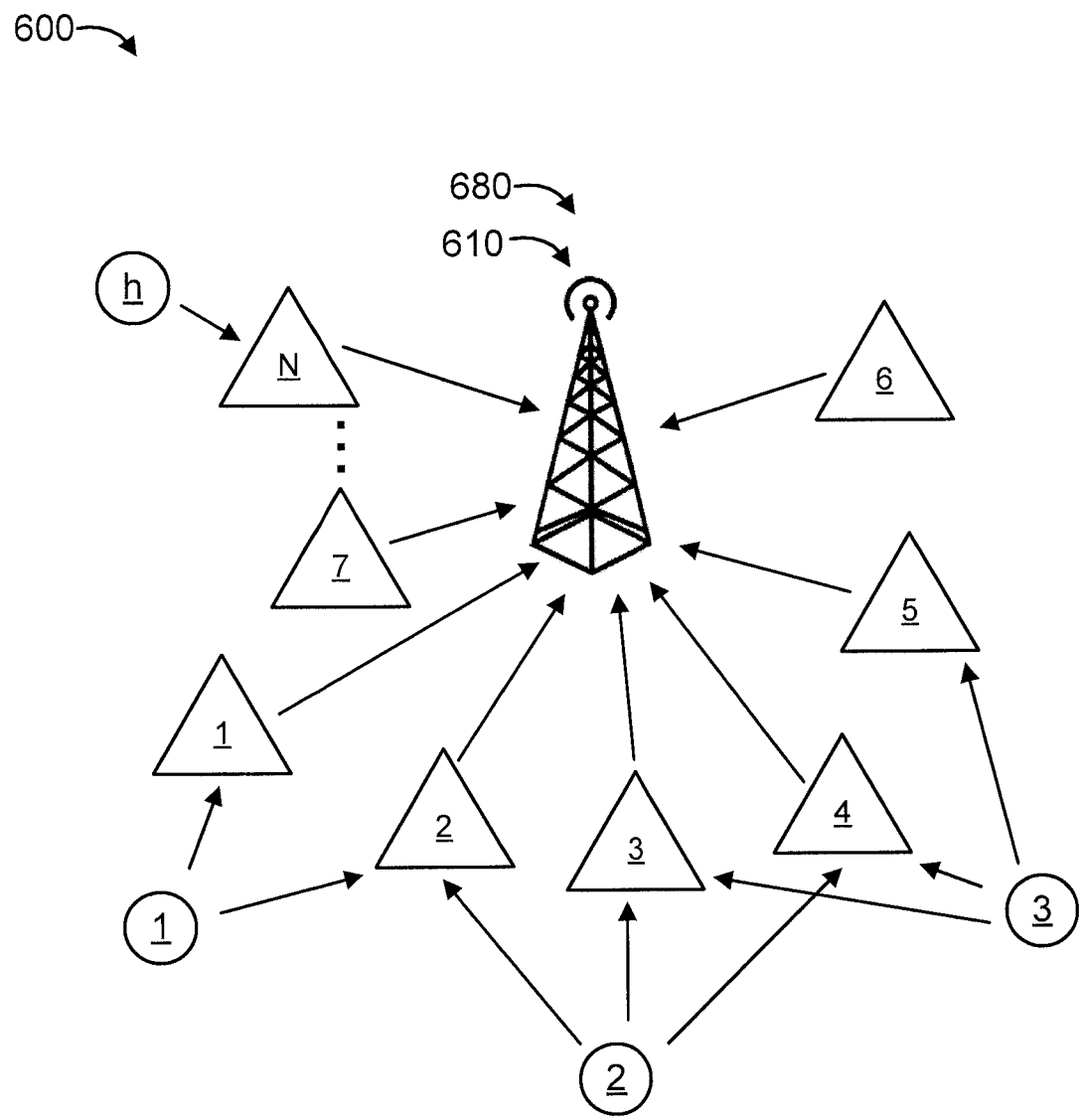
FIG. 6 is a block diagram showing an exemplary topology to which the present invention can be applied, in accordance with an embodiment of the present invention.
Figure 7:
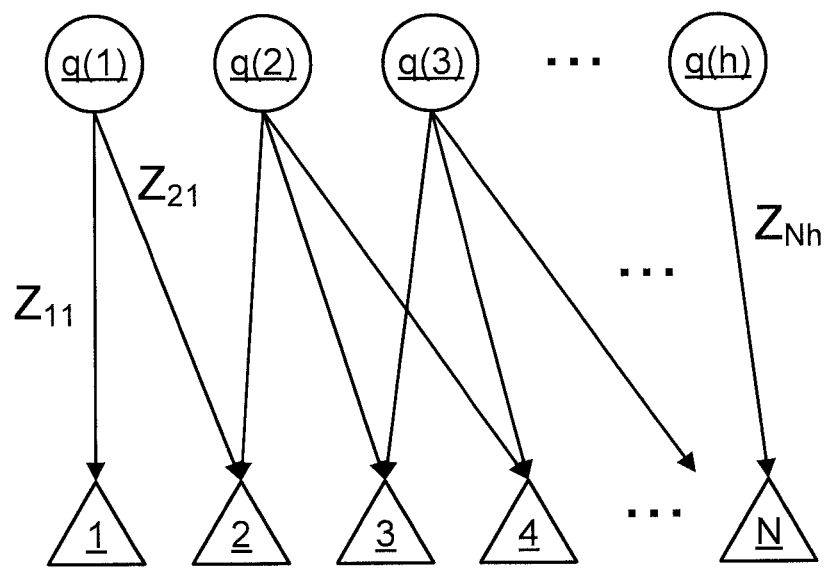
FIG. 7 is a block diagram showing an exemplary topology inference objective, in accordance with an embodiment of the present invention.

FIG. 6 is a block diagram showing an exemplary topology 600 to which the present invention can be applied, in accordance with an embodiment of the present invention. FIG. 7 is a block diagram showing an exemplary topology inference objective 700, in accordance with an embodiment of the present invention. In FIGS. 6 and 7, a base station (having or operatively coupled to a processing system 680 for controlling the base station) is denoted as "eNB" 610, hidden terminals are denoted by circles (labeled 1 through H), clients are denoted by triangles (labeled 1 through N). The topology 600 and objective 700 involve individual UL client access probabilities denoted by p(i), joint UL client access probabilities denoted by p(i,j), and hidden terminal access probabilities denoted by q( ).

Similar to wired network topology inference problems, one could employ Bayesian learning to estimate our wireless interference topology. Specifically, we have applied Monte Carlo Markov Chain (MCMC) based techniques, where the interference topology is adapted based on likelihood estimates such that the topology distribution converges to a stationary distribution that maximizes the posterior probability of the observed data (client access distributions). However, in addition to the time for convergence, note that the topology only converges in distribution in such an approach. Hence, when the topology information needs to be used for real-time scheduling of clients, one needs to sample this distribution to pick an actual topology as mismatches from the ground-truth topology could lead to sub-optimality.

While such Bayesian approaches are better suited for large scale networks with multiple-hops, the wireless topology that we are interested in has a single layer of nodes (hidden terminals) and their interference edges (to clients) and distributions that need to be estimated. Hence, BETL aims to de sign an alternate deterministic solution that can leverage this inherent structure to infer the topology with high accuracy. BETL accomplishes this in two steps.

Step 1: Graph Transformation

A goal of BETL is to infer the topology and access patterns of hidden terminals that contribute to the observed p(i) and p(i,j) of the clients in the cell. Let q(k) be the access probability of hidden terminal k. BETL applies a transformation to the access probabilities as follows:

$$P(i) = -\log(p(i)); \quad Q(k) = -\log(1 - q(k))$$

$$P(i, j) = -\log\left(\frac{p(i) \cdot p(j)}{p(i, j)}\right)$$

Figure 8:
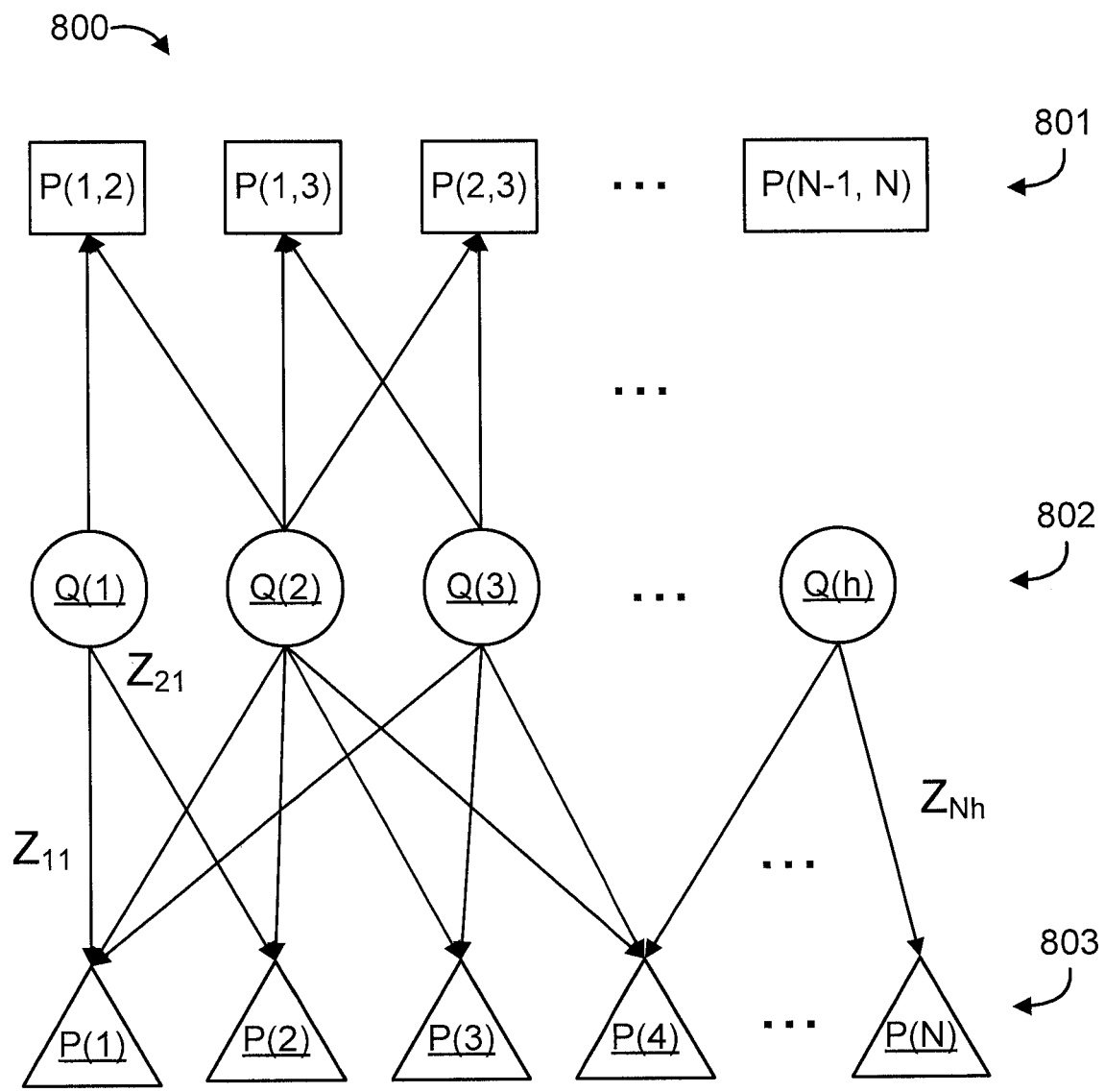
FIG. 8 is a block diagram showing an exemplary a graphical constraint satisfiability problem, in accordance with an embodiment of the present invention.

The transformation allows us to operate with the sum of the transformed variables as opposed to the product of the original variables (probabilities). This allows us to now formulate the topology inference problem as a graphical constraint satisfiability problem 800 as shown in FIG. 8, in accordance with an embodiment of the present invention. The graphical satisfiability problem 800 involves a first layer of nodes (shown using squares or rectangles) 801, a second layer of nodes (shown using circles) 802, and a third layer of nodes (shown using triangles) 803. The first layer of nodes 801 and the third layer of nodes 803 correspond to each of the input constraints (transformed access distributions, P(i) and P(i,j)) that we want to satisfy, while the second layer of nodes represents an "unknown" number (h) of hidden terminals, whose access distributions (Q(k)) and interference impact (edges, $z_{ik}$) we want to infer. Specifically, we need to determine the topology (h,Q,Z) that satisfies the following constraints:

$$P(i) = \sum_{k=1}^{h} z_{ik} Q(k), \quad \forall i \in \mathcal{N} \quad (5)$$

$$P(i, j) = \sum_{k=1}^{h} z_{ik} z_{jk} Q(k), \quad \forall i, j \in \mathcal{N}$$

where Z is a matrix, whose entries, $Z(i,k)=\{z_{ik}\}$, $\forall i,k$ are binary variables capturing the impact of hidden terminal k on client i. The first set of constraints captures that the access probability of a client i is the product of the idle probabilities $(1-q_k)$ of all hidden terminals k impacting it (i.e., $z_{ik}=1$). The second set of constraints indicates that the point mass mutual information (P(i,j)) between two clients (i,j) is given by the product of the idle probabilities of all hidden terminals that impact both the clients. Using more variables (hidden terminals, h) than the constraints can result in an underdetermined system with potentially many solutions. BETL aims to limit the solutions to those that satisfy the above constraints while minimizing the number of hidden terminals (h).

A description will now be given regarding topology inference, in accordance with an embodiment of the present invention.

BETL infers the topology by starting with an initialized topology (initialization discussed shortly) and then adapts the topology in each iteration through a gradient approach to improve the satisfiability of the constraints. At each iteration, it determines the constraint that is maximally violated. Then, it selects a hidden terminal k̂, along with its appropriate topology adaptation (ĥ,Q̂,Ẑ) that will resolve this violation, while minimizing the violation caused to the other constraints in the process. It terminates when all constraints are satisfied (zero violation), or the maximum number of iterations is reached, in which case the configuration with the least aggregate violation is chosen.

Topology Adaptation: There are multiple cases to consider during the adaptation process in each iteration.

Case 1: If the constraint chosen for restoring violation is an individual access constraint, P(i), two sub-cases arise based on the type of violation. Let $c_i = \sum_{k=1}^{h} z_{ik} Q(k) - P(i)$.

(i) Over-contribution ($c_i > 0$): BETL reduces the contribution by determining whether to decrease the appropriate contribution ($\hat{Q}(k) \leftarrow Q(k) - c_i$); (or) remove an edge completely ($\hat{z}_{ik} = 0$) from one of the existing hidden terminals k (impacting client i), where k:$z_{ik}=1$.

(ii) Under-contribution ($c_i < 0$): BETL determines whether to increase the appropriate contribution ($\hat{Q}(k) \leftarrow Q(k) + |c_i|$) from one of its hidden terminals k; (or) add an edge to one of the existing hidden terminals k (where $z_{ik}=0$) to avail its contribution (Q(k)) to P(i); (or) add a new hidden terminal k' with an edge to it ($\hat{z}_{ik'}=1$) that provides the missing contribution ($\hat{Q}(k')=|c_i|$).

Case 2: Similarly, if the constraint chosen is a joint access constraint, P(i,j), the corresponding scenarios are slightly more involved. Let $c_{i,j} = \sum_{k=1}^{h} z_{ik} z_{jk} Q(k) - P(i,j)$.

(i) Over-contribution ($c_{i,j} > 0$): BETL determines whether to reduce the appropriate contribution ($\hat{Q}(k) \leftarrow Q(k) - c_{i,j}$) from one of the contributing hidden terminals, k:$z_{ik} z_{jk}=1$; (or) remove an edge from one or both of the clients ($\hat{z}_{ik}=0$ and/or $\hat{z}_{jk}=0$) impacted by that hidden terminal.

(ii) Under-contribution ($c_{i,j} > 0$): BETL determines whether to increase the appropriate contribution ($\hat{Q}(k) \leftarrow Q(k) + |c_{i,j}|$) from one of its contributing hidden terminals k:$z_{ik} z_{jk}=1$; (or) add edge(s) to a hidden terminal k to avail its contribution (Q(k)), where an edge to only one or neither clients (i and j) exists, i.e., k:$z_{jk} + z_{ik} \leq 1$; (or) add a new hidden terminal (k') with two edges, one each to i and j ($\hat{z}_{ik'}=1$, $\hat{z}_{jk'}=1$) that provides the missing contribution ($\hat{Q}(k')=|c_{i,j}|$) to P(i,j).

At the end of the adaptation, hidden terminals left with no edges to clients are removed and the resulting topology (ĥ,Q̂,Ẑ) serves as input (h,Q,Z) to the next iteration.

A description will now be given regarding topology initialization, in accordance with an embodiment of the present invention.

Given the non-linear nature of the problem, a gradient based approach is not guaranteed to converge to an optimal solution and could end up in a locally optimal topology. To alleviate the resulting sub-optimality as well as to minimize the number of hidden terminals employed, BETL runs the inference algorithm by initializing with different starting topologies and picking the inferred topology with the least number of hidden terminals that yields the smallest violation. In addition to starting with random topologies with varied number of hidden terminals, it also picks from those that satisfy only one set of the constraints as starting topologies. Given the single layer of variables that need to be inferred, such a multi-point initialization is able to overcome local optima in most cases, thereby enabling the deterministic algorithm in BETL to yield high accuracies in topology inference.

A description will now be given of some additional consideration relating to blue-printing interference, in accordance with an embodiment of the present invention.

(1) Occasionally, when the number of hidden terminals is much larger than clients, multiple topologies (solutions) may satisfy the observed pair-wise client access distributions, making it infeasible to pinpoint the ground-truth topology. However, even in such cases, there is a large similarity between the topology inferred by BETL and ground-truth, which leads to a minimal degradation in BETL's scheduler performance. Further, in such scenarios, additional joint access distribution of clients (beyond pair-wise, say triplets) that maybe available (obtained) from existing (new) measurements, can provide additional constraints, which will significantly reduce the number of feasible topologies.

(2) BETL's topology inference currently assumes that the interference impact of a hidden terminal on different clients has a binary $\{0,1\}$ effect. While this will capture scenarios where clients are either strongly or weakly interfered by the hidden terminal, it does not accurately capture the fractional $[0,1]$ impact resulting from fading related interference variations. However, it must be noted that the sub-optimality resulting from this assumption is restricted to the specific clients in question. Hence, this does not appreciably affect the benefits to speculative scheduling, especially in the presence of a reasonable number of clients in the cell.

A description will now be given regarding generating higher-order distributions, in accordance with an embodiment of the present invention.

Having inferred the blue-print of the interference topology $\mathcal{T} = \{h^*, Q^*, Z^*\}$, we now demonstrate how BETL can compute the higher order access distributions from just the individual client access distributions, $\mathbb{P}(u_i)$.

Recall from Equation (3), we need to compute $\mathbb{P}(g, \overline{G'_b/g})$ i.e., the probability that all the clients in $g$ are able to utilize the grants, while all the remaining clients (in $G'_b/g$) are not able to. Without loss of generality, let us assume the following:

$$U_n = \{u_1, u_2, \ldots, u_n\}; \; V_m = \{v_1, v_2, \ldots, v_m\}$$

$$g = U_n; \; G'_b = U_n \cup V_m$$

Hence, we are interested in computing $\mathbb{P}(U_n, \overline{V_m})$ Applying Baye's theorem, we have the following:

$$\mathbb{P}(U_n, \overline{V_m}) = \mathbb{P}(\overline{V_m} | U_n) \cdot \mathbb{P}(U_n) \quad (6)$$

With the help of the inferred topology $\mathcal{T}$, we can now compute $\mathbb{P}(U_n)$ and $\mathbb{P}(\overline{V_m} | U_n)$ easily.

$P(U_n)$ can be further simplified as follows:

$$\mathbb{P}(u_1, \ldots, u_n) = \mathbb{P}((u_1, \ldots, u_{n-1}) | u_n) \cdot \mathbb{P}(u_n) = \mathbb{P}(U_{n-1} | u_n) \cdot \mathbb{P}(u_n)$$

Figure 9:
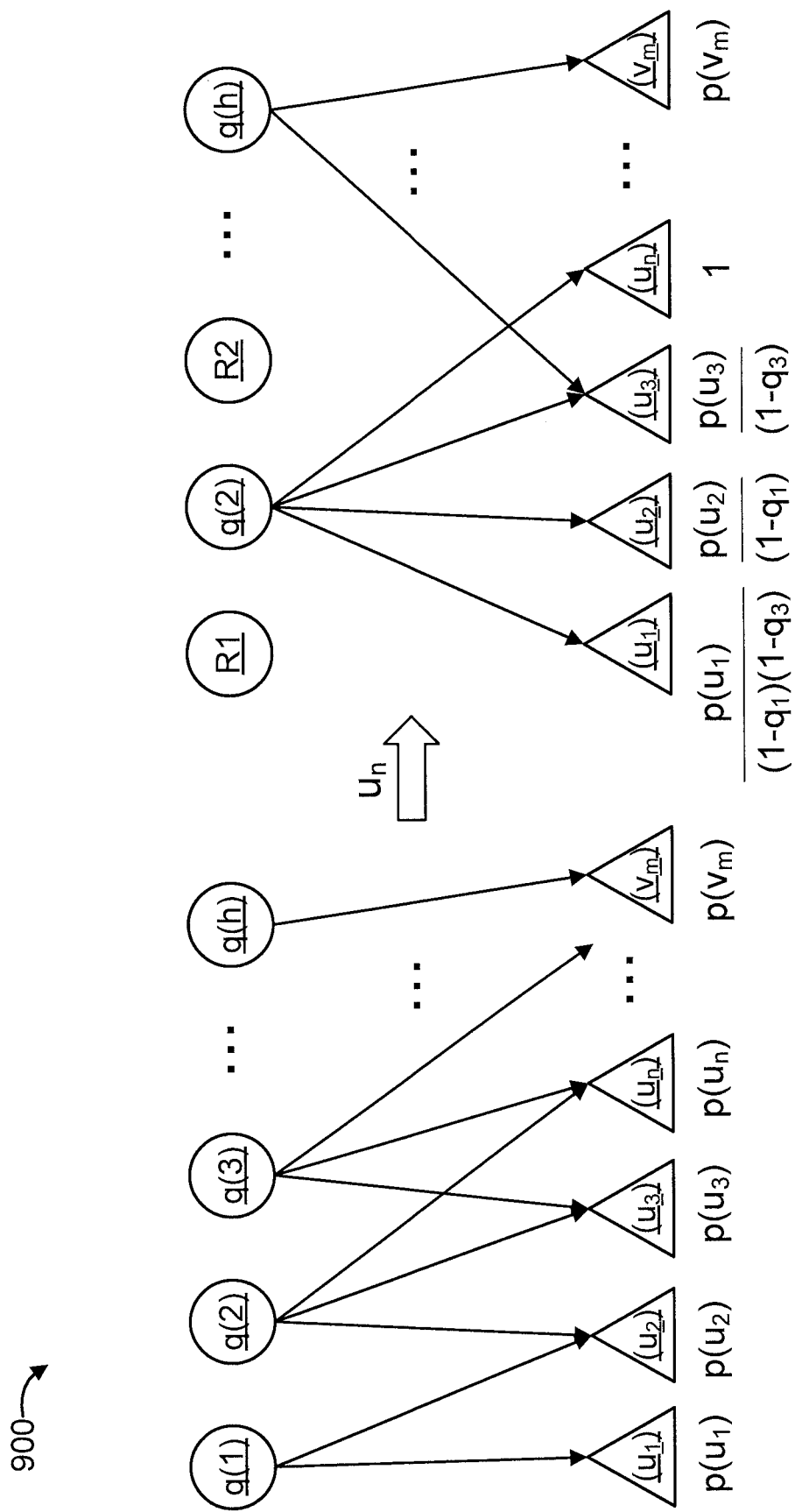
FIG. 9 is a block diagram showing an exemplary topology conditioning, in accordance with an embodiment of the present invention.

Computing $\mathbb{P}(U_{n-1} | u_n)$ on $\mathcal{T}$ is equivalent to computing just $\mathbb{P}(U_{n-1})$ but on a modified topology that is conditioned given the occurrence of $u_n$ as shown in FIG. 9. That is, FIG. 9 is a block diagram showing an exemplary topology conditioning 900, in accordance with an embodiment of the present invention. Given $u_n$'s occurrence, the topology gets updated (conditioned) by removing the hidden terminals $\hat{k}$ (denoted by the reference numerals R1 and R2) that have an edge to $u_n$ (i.e., $z_{u_n, \hat{k}} = 1$) and the access probabilities on this conditioned topology ($\mathcal{T} | u_n$) are updated using Equation (5) and represented as $\mathbb{P}_{u_n}(\bullet)$, where $$\mathbb{P}_{u_n}(u_i) = \frac{\mathbb{P}(u_i)}{\prod_{\hat{k}: (z_{u_i, \hat{k}} = 1)} (1 - q(\hat{k}))}$$

Thus, Equation (7) can be computed by recursively conditioning the topology ($\mathcal{T} | u_n, u_{n-1}, \ldots$) on the occurrence of each client in $U_n$ until it includes just the individual client access probabilities as follows:

$$\mathbb{P}(U_n) = \mathbb{P}(u_n) \cdot \mathbb{P}_{u_n}(u_{n-1}) \cdot \mathbb{P}_{u_n, u_{n-1}}(u_{n-2}) \ldots = \quad (7)$$
$$\mathbb{P}(u_n) \cdot (\prod_{a=1}^{n-1} \mathbb{P}_{u_n, \ldots, u_{n-a+1}}(u_{n-a}))$$

Focusing on the other term, $\mathbb{P}(\overline{V_m} | U_n)$ in Equation (6), this is essentially $\mathbb{P}(\overline{V_m})$ on the topology conditioned by the occurrence of all the clients in $U_n$, i.e., $\mathbb{P}(\overline{V_m} | U_n) = \mathbb{P}_{U_n}(\overline{V_m})$. Applying Baye's theorem, we have the following:

$$\mathbb{P}_{U_n}(\overline{V_m}) = \left(1 - \frac{\mathbb{P}_{U_n}(\overline{V_{m-1}} | v_m) \cdot \mathbb{P}_{U_n}(v_m)}{\mathbb{P}_{U_n}(\overline{V_{m-1}})}\right) \cdot \mathbb{P}_{U_n}(\overline{V_{m-1}}) = \quad (8)$$
$$\left(1 - \frac{\mathbb{P}_{U_n, v_m}(\overline{V_{m-1}}) \cdot \mathbb{P}_{U_n}(v_m)}{\mathbb{P}_{U_n}(\overline{V_{m-1}})}\right) \cdot \mathbb{P}_{U_n}(\overline{V_{m-1}})$$

As before, the above equation can be simplified by recursively conditioning the topology on the various clients in $V_m$ until it consists of just the individual access probabilities of clients in $V_m$ at various stages of the topology conditioning. Using Equations (7) and (8) in Equation (6), we are now able to compute the required higher order access distributions from just the individual client access distributions on the various conditioned topologies.

An example will now be described. In a four client (2 user MU-MIMO) schedule grant, the joint access distribution of clients 3 and 4 being able to transmit, while 1 and 2 not being able to, can be computed using the source interference topology and its conditioned versions as follows:

$$\mathbb{P}(\overline{1}, \overline{2}, 3, 4) = \mathbb{P}((\overline{1}, \overline{2}) | (3, 4)) \cdot \mathbb{P}(3, 4)$$

where $$\mathbb{P}(3, 4) = \mathbb{P}(3 | 4) \cdot \mathbb{P}(4) = \mathbb{P}_4(3) \cdot \mathbb{P}(4)$$

$$\mathbb{P}((\overline{1}, \overline{2}) | (3, 4)) = \mathbb{P}_{3,4}(\overline{1}, \overline{2}) = \left(1 - \frac{\mathbb{P}_{3,4,2}(\overline{1}) \cdot \mathbb{P}_{3,4}(2)}{\mathbb{P}_{3,4}(\overline{1})}\right) \cdot \mathbb{P}_{3,4}(\overline{1}).$$

A description will now be given regarding various competitive/commercial advantages provided by the present invention.

For example, in an embodiment, the present invention provides significantly improved throughout performance for cellular networks (e.g., LTE) in unlicensed spectrum. This leads to the design of competitively superior cellular base station products with significantly improved performance in unlicensed spectrum as networks evolve into 5G.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for speculative scheduling for mobile access in an unlicensed spectrum of a synchronous scheduled cellular access system, the system comprising:
a cellular base station having a processor, configured to compute an overall intelligent uplink schedule for a set of clients, the overall intelligent schedule being formed from a set of speculative schedules, being configured to maximize unlicensed spectrum usage, and being computed by
determining, by the processor, a speculative schedule for each resource block from among a set of resource blocks in a given sub-frame based on uplink access statistics determined for the clients individually and jointly; and
selecting, by the processor for formation into the overall intelligent schedule, (i) a particular resource block from the set and (ii) the speculative schedule for the particular resource block, that yield the maximum incremental utility relative to already determined speculative schedules for other ones of the resource blocks in the set, based on criteria that includes the uplink access statistics, and
wherein the processor executes the overall intelligent schedule responsive to a completion of the speculative schedule determination for each of the resource blocks in the given sub-frame;
wherein the processor determines the speculative schedule, for a remaining un-scheduled one of the resource blocks in the set, which yields the maximum incremental utility relative to the already determined speculative schedules;
wherein the processor determines the speculative schedule for the remaining un-scheduled one of the resource blocks in the set by adding one of the clients at a time such that the one of the clients yields the maximum incremental utility relative to the already determined speculative schedules for the other ones of the resource blocks in the set; and
where the maximum incremental utility provided by a group of the clients associated with the remaining un-scheduled one of the resource blocks in the set is weighted by a joint access probability of the clients in the group.

2. The system of claim 1, wherein the joint access probability of the clients in the group constrains a total number of active ones of the clients in the group to be less than or equal to a total number of antennas at the cellular base station.

3. A computer-implemented method for speculative scheduling for mobile access in an unlicensed spectrum of a synchronous scheduled cellular access system, comprising:
computing, by a cellular base station having a processor, an overall intelligent uplink schedule for a set of clients, the overall intelligent schedule being formed from a set of speculative schedules, being configured to maximize unlicensed spectrum usage, and being computed by
determining, by the processor, a speculative schedule for each resource block from among a set of resource blocks in a given sub-frame based on uplink access statistics determined for the clients individually and jointly; and
selecting, by the processor for formation into the overall intelligent schedule, (i) a particular resource block from the set and (ii) the speculative schedule for the particular resource block, that yield the maximum incremental utility to already determined speculative schedules for other ones of the resource blocks in the set, based on criteria that includes the uplink access statistics,
executing, by the processor, the overall intelligent schedule responsive to a completion of each of the resource blocks in the sub-frame being scheduled; and
determining the speculative schedule, for a remaining un-scheduled one of the resource blocks in the set, which yields the maximum incremental utility relative to the already determined speculative schedules;
wherein the speculative schedule for the remaining un-scheduled one of the resource blocks in the set is determined by adding one of the clients at a time such that the one of the clients yields the maximum incremental utility relative to the already determined speculative schedules for the other ones of the resource blocks in the set;

where the maximum incremental utility provided by a group of the clients associated with the remaining un-scheduled one of the resource blocks in the set is weighted by a joint access probability of the clients in the group.

4. The computer-implemented method of claim 3, wherein the joint access probability of the clients in the group constrains a total number of active ones of the clients in the group to be less than or equal to a total number of antennas at the cellular base station.

5. A computer program product for speculative scheduling for mobile access in an unlicensed spectrum of a synchronous scheduled cellular access system, the computer program product comprising a non-transitory computer readable storage medium having program instructions embodied therewith, the program instructions executable by a computer for controlling a cellular base station to cause the computer to perform a method comprising:

computing, by a cellular base station having a processor, an overall intelligent uplink schedule for a set of clients, the overall intelligent schedule being formed from a set of speculative schedules, being configured to maximize unlicensed spectrum usage, and being computed by determining, by the processor, a speculative schedule for each resource block from among a set of resource blocks in a given sub-frame based on uplink access statistics determined for the clients individually and jointly; and selecting, by the processor for formation into the overall intelligent schedule, (i) a particular resource block from the set and (ii) the speculative schedule for the particular resource block, that yield the maximum incremental utility to already determined speculative schedules for other ones of the resource blocks in the set, based on criteria that includes the uplink access statistics, executing, by the processor, the overall intelligent schedule responsive to a completion of each of the resource blocks in the sub-frame being scheduled; and determining the speculative schedule, for a remaining un-scheduled one of the resource blocks in the set, which yields the maximum incremental utility relative to the already determined speculative schedules;

wherein the speculative schedule for the remaining un-scheduled one of the resource blocks in the set is determined by adding one of the clients at a time such that the one of the clients yields the maximum incremental utility relative to the already determined speculative schedules for the other ones of the resource blocks in the set;

where the maximum incremental utility provided by a group of the clients associated with the remaining un-scheduled one of the resource blocks in the set is weighted by a joint access probability of the clients in the group.

6. The computer program product of claim 5, wherein the joint access probability of the clients in the group constrains a total number of active ones of the clients in the group to be less than or equal to a total number of antennas at the cellular base station.

* * * * *